United States Patent [19]

Furuta et al.

[11] Patent Number: 4,585,603
[45] Date of Patent: Apr. 29, 1986

[54] METHOD FOR CONTROLLING AN EXTRUSION LINE FOR FOAMED INSULATION CABLES INVOLVING USE OF A PLURALITY OF GENERATED AND MEASURED ELECTRICAL SIGNALS

[75] Inventors: Katsuhisa Furuta, Tokyo; Yoshinori Nakamura, Kawasaki; Kazuhiko Asaka, Yokohama, all of Japan

[73] Assignee: Showa Electric Wire & Cable Co., Ltd, Kawasaki, Japan

[21] Appl. No.: 473,506

[22] Filed: Mar. 8, 1983

[30] Foreign Application Priority Data

Mar. 15, 1982 [JP] Japan .................................. 57-40543
Mar. 15, 1982 [JP] Japan .................................. 57-40544

[51] Int. Cl.$^4$ ..................... B29C 47/92; B29C 47/02; B29C 67/22; G05B 11/32
[52] U.S. Cl. ..................... 264/40.6; 264/40.7; 264/45.9; 264/174; 364/172; 425/113; 425/144; 425/145; 425/81.70
[58] Field of Search .............. 425/145; 264/40.7, 45.9, 264/174

[56] References Cited

U.S. PATENT DOCUMENTS

| | | | |
|---|---|---|---|
| 3,473,008 | 10/1969 | Bay et al. | 235/151.12 |
| 3,714,952 | 2/1973 | Bristol | 137/1 |
| 3,914,356 | 10/1975 | Dembiak et al. | 264/40.7 X |
| 3,941,534 | 3/1976 | Hunkar | 264/40.7 X |
| 4,088,430 | 5/1978 | Giles | 425/145 X |
| 4,174,236 | 11/1979 | Dougherty et al. | 264/40.7 X |
| 4,229,392 | 10/1980 | Shimano et al. | 264/40.1 |
| 4,257,991 | 3/1981 | Kirjavainen | 264/40.7 X |
| 4,260,351 | 4/1981 | Takano et al. | 425/145 X |
| 4,298,887 | 11/1981 | Rode | 358/113 |
| 4,326,255 | 4/1982 | Fujita | 264/40.1 X |
| 4,344,142 | 8/1982 | Diehr, II et al. | 264/40.1 X |
| 4,359,436 | 11/1982 | Henderson et al. | 264/45.9 X |
| 4,399,105 | 8/1983 | Tilgner et al. | 425/145 X |
| 4,406,399 | 9/1983 | Furuta et al. | 236/15 BC |

FOREIGN PATENT DOCUMENTS 2215652 1/1974 France .
2224808 3/1974 France .
2426934 5/1978 France .

OTHER PUBLICATIONS

Izawa, Keisuke, *Guide for Automatic Control,* Tokyo, Japan, OHM Publishing Co., Feb. 20, 1964, pp. 6-7.
Grabbe, Eugene M.; Simon Ramo and Dean E. Wooldridge, *Handbook of Automation, Computation and Control,* New York, N.Y. John Wiley & Sons, pp. 20-62.

(List continued on next page.)

*Primary Examiner*—Philip Anderson
*Attorney, Agent, or Firm*—Pahl, Lorusso & Loud

[57] ABSTRACT

There is disclosed a method for controlling an extrusion line for foamed insulation cables. In this method, a foaming insulation compound composed of a polyolefin resin and a foaming agent is supplied to an extruder, and extruded and coated as a foamed insulation onto a continuously fed cable conductor at a temperature higher than a decomposition temperature of the foaming agent to produce a cable that is subsequently passed through a cooler unit for controlling the outside diameter and electrostatic capacity of the foamed insulation. The system is controlled so that a plurality of measured variables including a plurality of controlled variables such as the outside diameter and the electrostatic capacity and condition variables affecting the controlled variables, such as a cylinder temperature of the extruder, a crosshead temperature of the extruder, a resin temperature and a resin pressure in the crosshead, are variable in predetermined correlation with a plurality of manipulated variables as input parameters which vary the controlled variables, such as a line speed of the extrusion line, a voltage applied to a preheater disposed in front of the extruder, an RPM of a screw in the extruder, a voltage applied to a cylinder heater in the extruder, a voltage applied to a crosshead heater, and a distance which the cooler unit is movable. The controlled variables are controlled so as to be adjusted into target values therefor by manipulation variables which are produced by effecting an integrating action on variable factors which are derived from the differences between the target values and the controlled variables.

21 Claims, 9 Drawing Figures

OTHER PUBLICATIONS

Chestnut, Harold and Robert W. Mayer, *Servomechanism and Regulating System Design*, vol. 1, "The Automatic Control Problem," New York, N.Y., John Wiley & Sons, Mar. 1958, pp. 2-3.

*McGraw-Hill Dictionary of Scientific and Technical Terms*, Daniel N. Lapedes, Edt., Second Edition, New York, McGraw-Hill, pp. 920-921.

Brasch, Frederick M. and James B. Pearson, "Pole Placement Using Dynamic Compensators" in *IEEE Transactions on Automatic Control*, vol. AC-15, No. 1, The Institute of Electrical and Electronic Engineers, Inc., Feb. 1970, p. 34.

*Modern Dictionary of Electronics*, Rudolf F. Graf, Indianapolis, Ind., Howard W. Sams & Co., Inc. and The Bobbs-Merrill Co., Inc., pp. 149, 180 and 248.

Englander, Arnold, "The Benefits and Problems of P.I.D. Feedback Control", Wire Journal, Sep. 1981, pp. 234-239.

Degen, R. J., "Entwurf und Simulation Eines Adaptiven Regelungssystems mit Modellabhleich"; Regelungstechnik, vol. 24, No. 1, 1976, pp. 24-27.

MacFarlane, A. G. J.: Stevenage; "Multivariable-Control-System Design Techniques: A Guided Tour", Proceedings IEE, vol. 117, No. 5, May 1970, pp. 1039-1047.

Young, S. C. K., "Raw Material Blending—A Multivariable Control Problem"; IEE Conference Publication, No. 78, Sep. 1971.

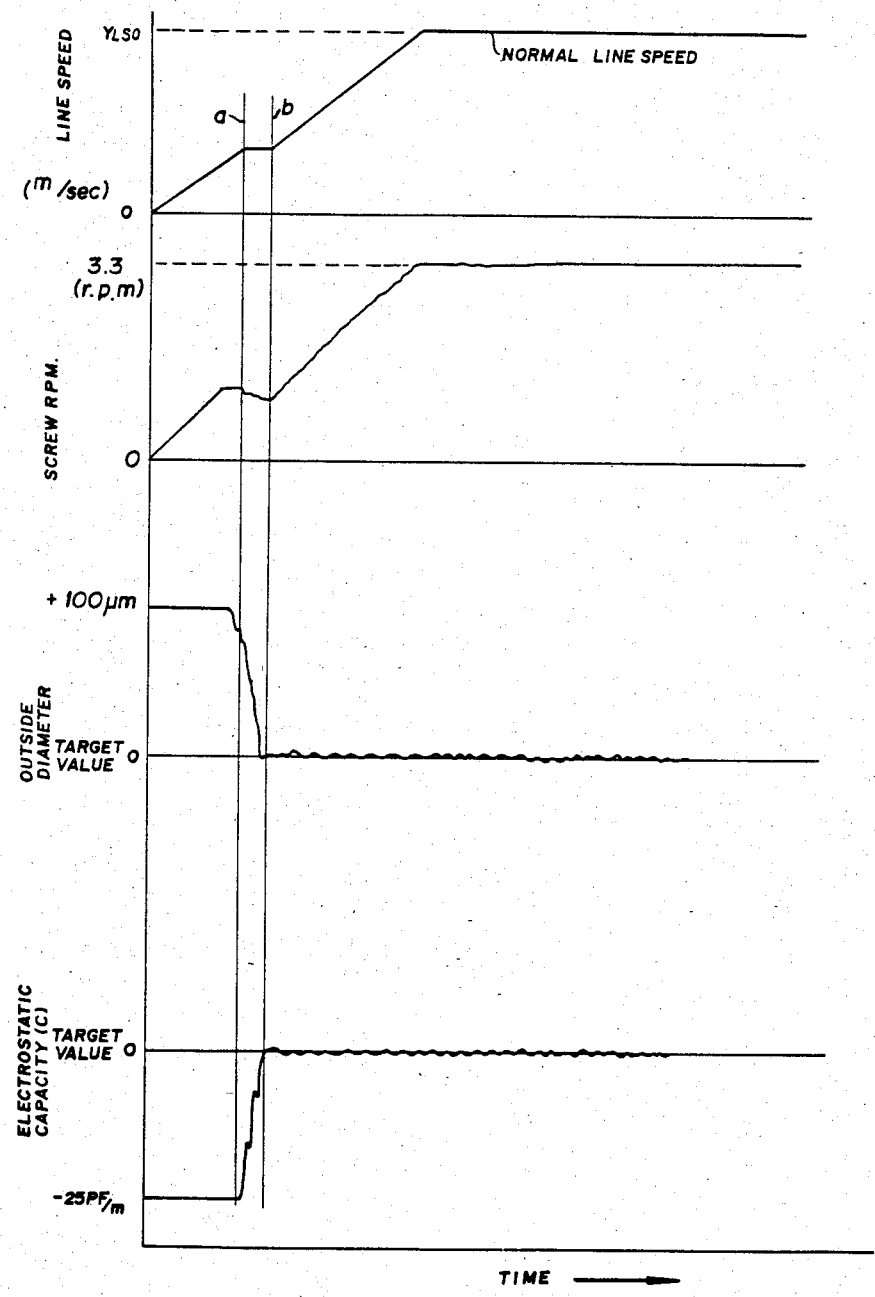

METHOD FOR CONTROLLING AN EXTRUSION LINE FOR FOAMED INSULATION CABLES INVOLVING USE OF A PLURALITY OF GENERATED AND MEASURED ELECTRICAL SIGNALS

BACKGROUND OF THE INVENTION

The present invention relates to a method for controlling an extrusion line for formed insulation cables, and more particularly to such a cable extrusion line control system with controlled variables such as the outside diameter and electrostatic capacity of foamed insulation extruded and coated on the cable being multivariables.

Communication cables are generally composed of a conductor with a coating of insulation extruded thereon having a small electrostatic capacitance and hence a small dielectric constant to meet the demand for a reduced transmission loss caused by the cable. The insulation is also required to support the cable itself. For these reasons, polyethylene foams (PEF) with a multiplicity of cells contained in polyethylenes are widely used as insulation for communication cables.

FIGS. 1 and 2 of the accompanying drawings illustrate an extrusion line 10 for foamed insulation cables with insulation made of foamed polyolefin resins. The extrusion line 10 has a wire drawing unit 12 for elongating a wire rod 11 unwound from a wire stack 10a into a cable conductor 13 having a smaller diameter than that of the wire rod, and an annealer unit 14 for annealing the cable conductor 13 with current annealing.

The cable conductor 13 is then guided through a first dancer roller 15 preferably to an inductive preheater 16 and thereafter continuously to an extruder 17. The preheater 16 serves to preheat the cable conductor 13 for allowing insulation which be coated later to be uniformly foamed and also to be held in intimate contact with the cable conductor 13. The extruder 17 has a hopper 18 through which a foaming insulation compound composed of a polyolefin resin and an organic foaming agent is supplied to the extruder 17. The supplied compound is forced into a crosshead 21 by a screw 20 disposed in a cylinder 19, as shown in FIGS. 3 and 4. The screw 20 is driven by a motor 22 to rotate about its own axis. A cylinder heater 23 comprises a plurality of separate heater units 23-1 through 23-4 surrounding the cylinder 19. The crosshead 21 is heated by a crosshead heater 24 composed of a pair of crosshead heater units 24-1, 24-2. When the screw 20 rotates, and the cylinder heater 23 and the crosshead heater 24 are heated, the foaming insulation compound is heated at a temperature higher than the decomposition temperature of the foaming agent and is fed out from a restrictor 25 of the crosshead 21 in a direction normal to the axis of the restrictor 25. The foaming insulation compound is then extruded and coated onto the cable conductor 13 at a nipple 26.

Compressed gas contained in the foaming insulation compound under high pressure in the extruder 17 is expanded in the compound when the compound is extruded into the atmosphere. The expanded gas forms cells in the compound which have maximum volumes when the pressure therein is equalized to the atmospheric pressure. By cooling the foamed insulation, the pressure in the cells is reduced to thereby allow the foamed insulation to shrink in volume. To effect such cooling, the extrusion line includes a movable cooler unit 27 comprising a water trough 29 with a movable water trough 28 slidably disposed at an upstream end thereof. The distance between the movable water trough 28 and the crosshead, particularly its nipple 26, is adjusted to suppress the growth of chemical foaming in the insulation by water-cooling the latter in surrounding relation, and also to form a barrier on the outer peripheral surface of the resin for preventing foaming therein. The degree at which the foaming gas is expanded in the foamed insulation can thus be adjusted to gain a desired outside diameter and electrostatic capacity of the insulation.

The cooler unit 27 may be immovable with the amount and temperature of water contained therein being controllably variable.

The extrusion line 10 has an outside-diameter gage 30 for measuring the outside diameter of the insulation formed, and an electrostatic-capacity sensor 31 for measuring the electrostatic capacity of the insulation. The outside-diameter gage 30 may be a laser outside-diameter gage, type M501B, with the accuracy of 1 micron, manufactured by Anritsu Denki K.K., Japan. The electrostatic-capacity sensor 31 may be a sensor KI-700CGA (sensor KG 500) manufactured by BETA Company, Bucks in High Wycombe, England, the sensor being capable of measuring the electrostatic capacity (PF/m) of the formed insulation cable with the accuracy of ±0.1 PF/m.

In addition to the above gage 30 and the sensor 31, the extruder 17 has a plurality of cylinder-temperature sensors TM1 through TM4, and the crosshead 21 has a resin-temperature sensor TM5, a crosshead-temperature sensor TM6, and a resin-pressure gage PM (type CZ-1P manufactured by Rikagaku Kogyosha, Japan).

The foamed insulation cable is drawn by a withdrawal unit 32 and wound around a drum by a cable winder 34 through a second dancer roller 33.

In the manufacture of foamed insulation cables, it is necessary that the outside diameter (D) of the cable and the elestrostatic capacity (C) of the insulation be uniform in the longitudinal direction of the cable.

To provide a desired outside diameter and electrostatic capacity through controlling the extrusion process on the extrusion line 10, it has been customary practice to control the RPM of the screw 20 in the extruder 17 and the voltage applied to the preheater 16 in proportion to the speed at which the cable is withdrawn by the withdrawal unit 32, that is, the line speed.

The elestrostatic capacity (C) has been controlled by moving the movable water trough 28, while the outside diameter (D) has manually been ajusted. The manual adjustment of the outside diameter (D) has been carried out empirically by varying the RPM of the extruder screw 20 and the extruder temperature. In the actual practice, however, movement of the movable trough 28 results in a change in the electrostatic capacity and simultaneously in a change in the outside diameter. Although this control can control the electrostatic capacity at will, the outside diameter cannot be controlled since it undergoes a departure from the desired value. As a consequence, it has been quite difficult to control the electrostatic capacity and the outside diameter independently of each other with a view to manufacturing cables of high quality.

With the extrusion line of this type, a reduction in the RPM of the screw or an increase in the line speed while the extrusion temperature is kept constant results in a reduction in the outside diameter of the cable. When the extrusion temperature is increased, the expansion ratio of the insulation is increased and the outside diameter becomes larger. With the line speed going higher, the period of time required for the insulation to be cooled and solidified after extrusion is shortened, and hence the foaming process is finished early, resulting in a lower expansion ratio. Accordingly, these variable factors are related closely to each other. It is necessary to effect stable control of the outside diameter and electrostatic capacity (foaming ratio) while taking into account the correlation between these factors.

In multivariable control, a multiplicity of measured variables, including, in the illustrated arrangement, the outside diameter D of the cable, the electrostatic capacity C of the insulation, which are controlled variables, temperatures C3, C4 indicated on the cylinder-temperature sensors TM3, TM4, a temperature C6 indicated on the crosshead-temperature sensor TM6, a temperatue C5 indicated on the resin-temperature sensor TM5, and a pressure P indicated on the resin-pressure gage PM, are varied when any one of a multiplicity of manipulated variables including, in the illustrated arrangement, the RPM of the screw 20, the voltage applied to the preheater 16, the voltages applied to the cylinder heater units 23-3, 23-4, the voltages applied to the crosshead heater units 24-1, 24-2, the distance between the movable water tank 28 and the crosshead 21. With this type of multivariable control, it has conventionally been quite difficult by means of the measured variables to control the manipulated variables, simultaneously and automatically until the controlled variables reach desired values.

The control system in which the control variables and the manipulation variables are correlated in pairs cannot achieve quick response to and compensation for disturbances, with the consequences that the variables to be controlled are less stable and responsive. Since this control system does not control the electrostatic capacity C and the outside diameter D in response to the line speed, all of the products fabricated up to the point in which the line speed is rendered normal are useless. Furthermore, since the electrostatic capacity C and the outside diameter D are not constant until the resin temperature and the other temperatures are increased even during the normal operation, any cable manufactured before the required temperatures are reached is also useless. Therefore, the yield with the prior extrusion line has been poor.

SUMMARY OF THE INVENTION

The above-described drawbacks in the prior art apparatus have been successfully eliminated by the present invention.

It is a primary object of the present invention to provide a method for controlling an extrusion line for foamed insulation cables by simultaneously and automatically controlling electrical signals represented by variables to be manipulated in an extruder, a preheater and a cooler unit until variables to be controlled reach desired values (target settings) through detecting elements for detecting electrical signals represented by variables to be electrical signals represented by variables to be measured including such controlled variables as the outside diameter and electrostatic capacity of the cable, for thereby performing multivariable control of the extrusion line.

Another object of the present invention is to provide an extrusion line control method having control means having increased stability and/or responsiveness, and capable of quick compensation for or response to disturbances.

Still another object of the present invention is to provide a method for controlling an extrusion line for foamed insulation cables by simultaneously and automatically controlling variables to be manipulated in an extruder, a preheater and a cooler unit until variables to be controlled reach desired values (target settings) through detecting elements for detecting variables to be measured including such controlled variables as the outside diameter, electrostatic capacity of the cable, and the line speed for thereby performing multivariable control of the extrustion line, so that the yield of the extrusion line can be increased.

The above objects can be achieved by a method for controlling an extrustion line for foamed insulation cables in which a foaming insulation compound composed of a polyolefin resin and a foaming agent is supplied to an extruder, and extruded and coated as a foamed insulation onto a continuously fed cable conductor at a temperature higher than a decomposition temperature of the foaming agent to produce a cable that is subsequently passed through a cooler unit controlling the outside diameter and electrostatic capacity of the foamed insulation, the system being characterized in that a plurality of generated and measured electrical signals designated by measured variables:

$$\begin{pmatrix} Y1 \\ Y2 \\ \cdot \\ \cdot \\ Yl \\ \cdot \\ \cdot \\ Ym \end{pmatrix}$$

said measured electrical signals including a plurality of controlled electrical signals designated by controlled variables such as the outside diameter and the electrostatic capacity:

$$Y = \begin{pmatrix} Y1 \\ Y2 \\ \cdot \\ \cdot \\ Yl \end{pmatrix}$$

and condition electrical signals designated by condition variables affecting the controlled variables, such as a cylinder temperature of the extruder, a crosshead temperature of the extruder, a resin temperature and a resin pressure in the crosshead, are variable in predetermined correlation with a plurality of manipulated electrical signals designated by manipulated variables as input parameters such as a line speed of the extrusion line, a voltage applied to a preheater disposed in front of the extruder, an RPM of a screw in the extruder, a voltage applied to a cylinder heater in the extruder, a voltage applied to a crosshead heater, and a distance which the cooler unit is movable:

$$U = \begin{pmatrix} U1 \\ \vdots \\ Un \end{pmatrix}$$

(where l, n, and m are positive integers of 2 or greater with n, m ≧ l) which vary the controlled variables, the controlled variables being controlled so as to be adjusted into target values therefor:

$$YR = \begin{pmatrix} YR1 \\ \vdots \\ YRl \end{pmatrix}$$

by manipulation variables:

$$Uc = \begin{pmatrix} Uc1 \\ \vdots \\ Ucn \end{pmatrix}$$

which are produced by effecting an integrating action on variable factors:

$$U'c = \begin{pmatrix} U'c1 \\ \vdots \\ U'cn \end{pmatrix}$$

which are derived from the differences between the target values and the controlled variables:

$$YR - Y = \begin{bmatrix} YR1 - Y1 \\ \vdots \\ YRl - Yl \end{bmatrix} = \begin{bmatrix} \epsilon1 \\ \vdots \\ \epsilon l \end{bmatrix}.$$

These and other objects of the invention will become apparent from the following description of embodiments thereof when taken together with the drawings. In the following description, the term "variables" is used to represent a quantified value or magnitude of "electrical signals" in any discussion concerning numerical manipulation of such variables.

BRIEF DESCRIPTION OF THE DRAWINGS

FIG. 9 is a graph showing settings for variables to be controlled by the control system of FIG. 8 and results of its controlling operation.

DETAILED DESCRIPTION OF THE PREFERRED EMBODIMENTS

Figure 1:
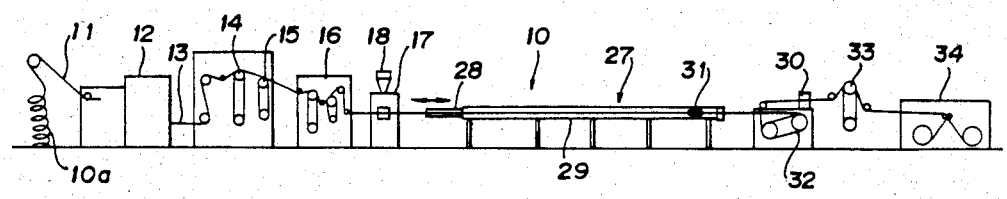
FIGS. 1 and 2 are schematic side elevational and plan views of an extrusion line for foamed insulation cables which is to be controlled.
Figure 2:
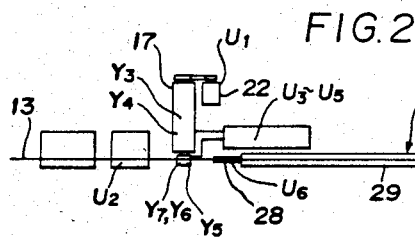
Figure 3:
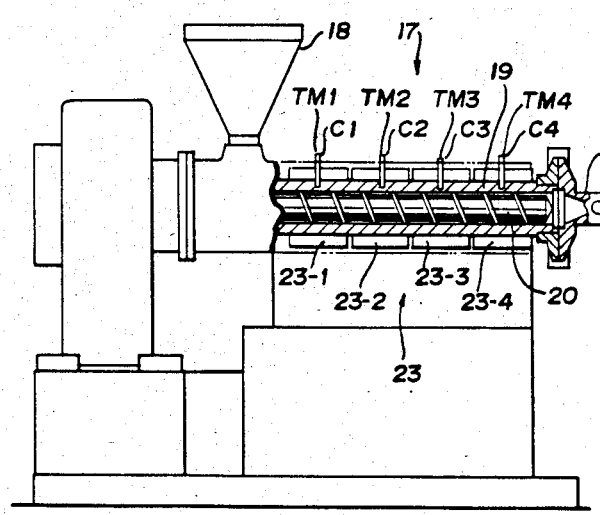
FIG. 3 is an enlarged side elevational view, partly in cross section, of an extruder in the extrusion line shown in FIGS. 1 and 2.
Figure 4:
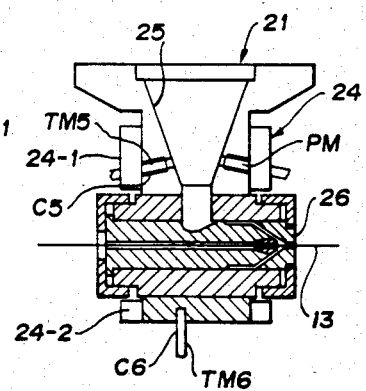
FIG. 4 is an enlarged side elevational view, partly in cross section, of a crosshead in the extruder of FIG. 3.
Figure 6:
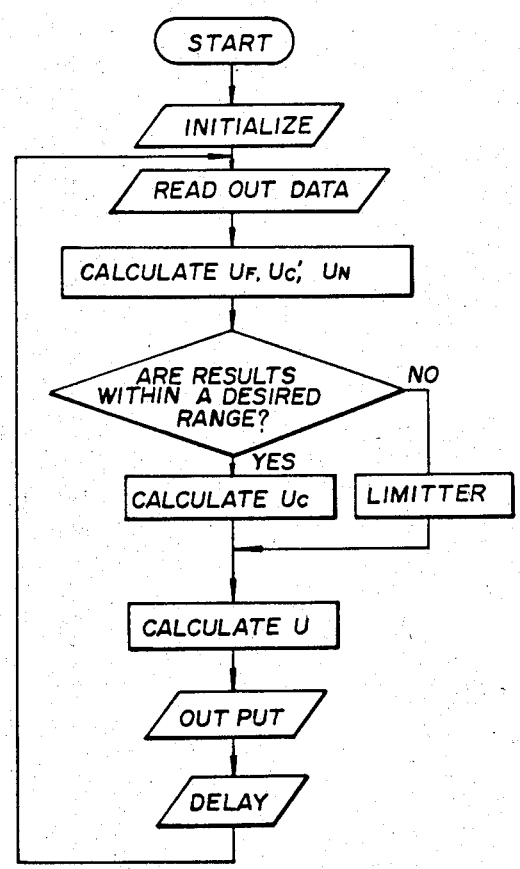
FIG. 6 is a flowchart illustrative of operations of the control method shown in FIG. 5.
Figure 7:
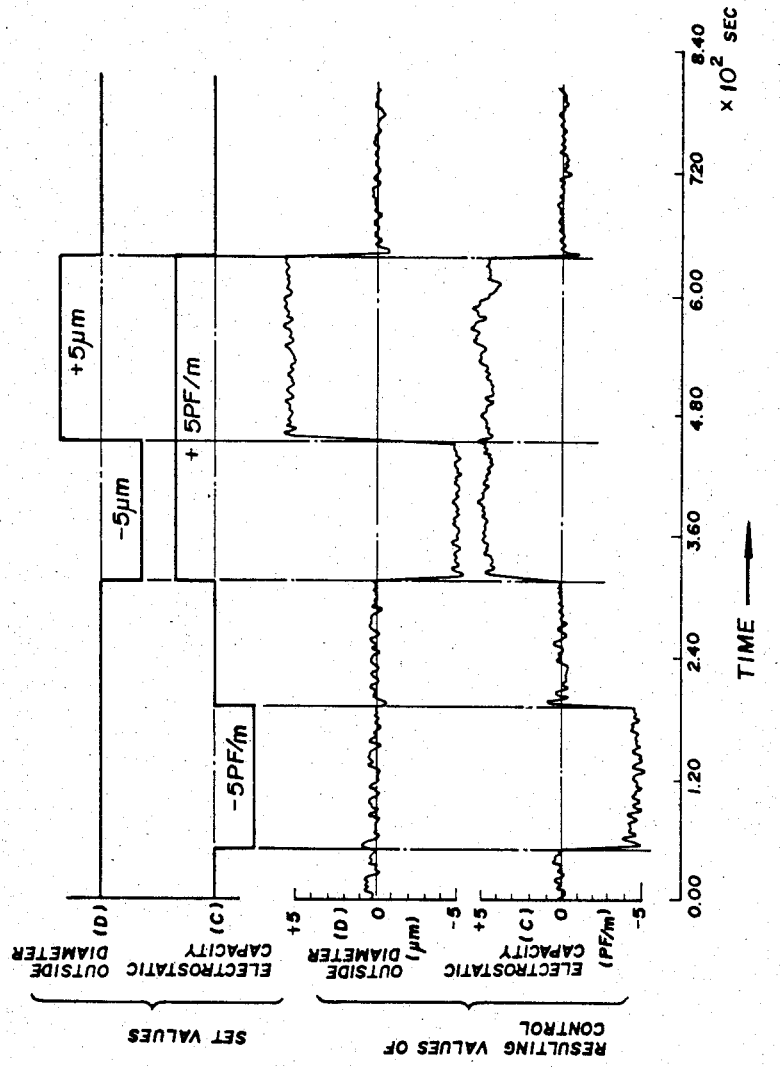
FIG. 7 is a graph showing settings for variables to be controlled by the control method of FIG. 5 and results of its controlling operation.

A method for controlling an extrusion line for foamed insulation cables according to the present invention will be described in detail with reference to FIGS. 5 through 7 in which the control method is associated with the extrusion line shown in FIGS. 1 and 2.

Figure 5:
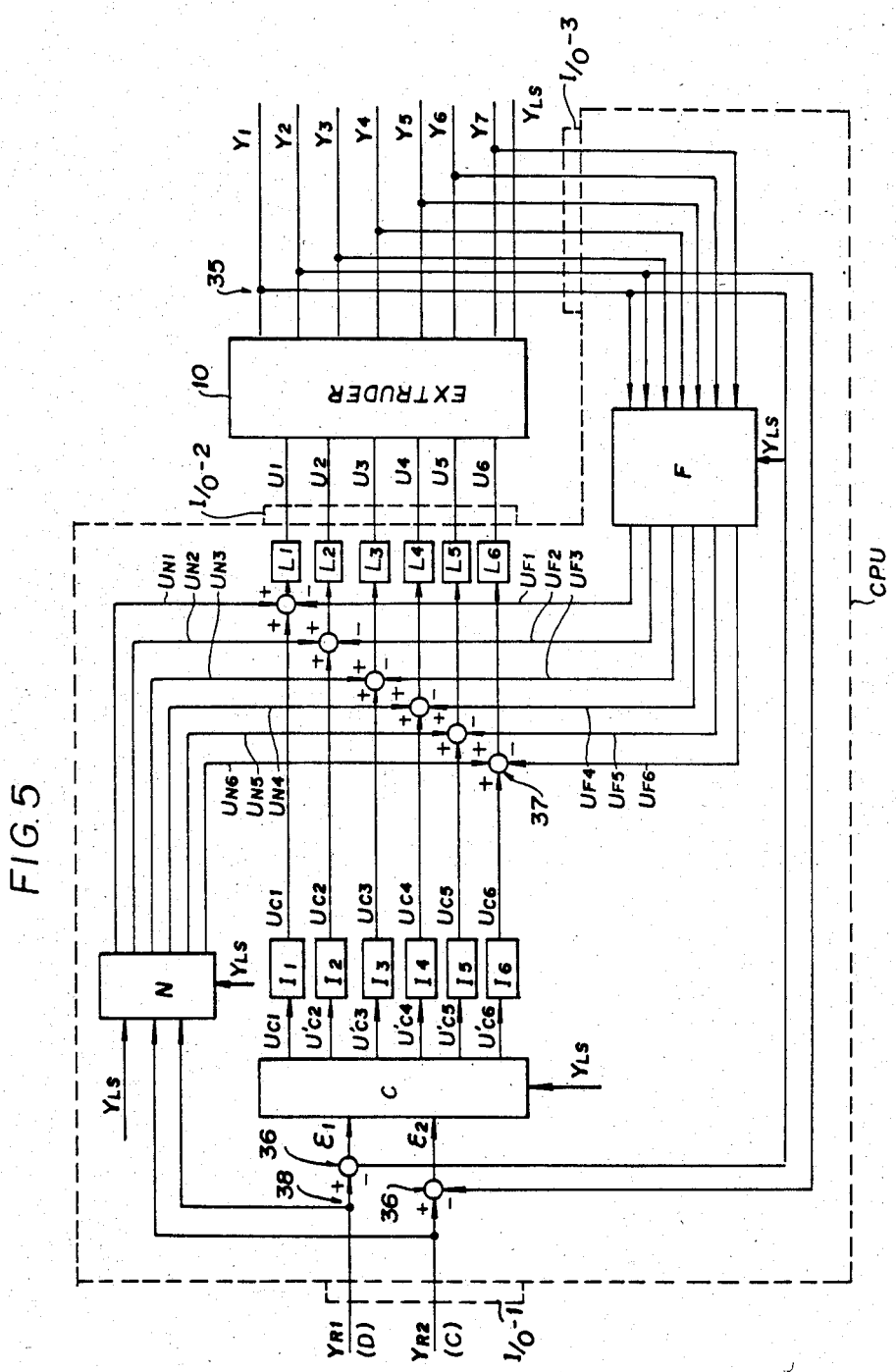
FIG. 5 is a block diagram of an automatic multivariable control system according to the present invention for use in controlling the extrusion line of FIGS. 1 and 2.

In the control system illustrated in FIG. 5, a plurality of measured generated and measured electrical signals designated by variables:

$$\begin{bmatrix} Y1 \\ Y2 \\ Y3 \\ Y4 \\ Y5 \\ Y6 \\ Y7 \end{bmatrix}$$

which comprises: controlled electrical signals designated by controlled variables (the outside diameter D and the electrostatic capacity C):

$$Y = \begin{bmatrix} Y1 \\ Y2 \end{bmatrix}$$

of a cable extruded by the extrusion line 10 to be controlled, and condition electrical signals designated by condition variables affecting the controlled variables (cylinder temperatures C3, C4, a crosshead temperature C6, a resin temperature C5, and a resin pressure P) are varied by a plurality of electrical signals to be manipulated designated by manipulated variables entered as input parameters (the RPM of the screw 20, the voltage applied to the preheater 16, the voltages applied to the cylinder heater units 23-3, 23-4, the voltages applied to the crosshead heater units 24-1 and 24-2, and the distance between the cooler unit 27 and the movable water tank 28) for changing the controlled variables:

$$U = \begin{bmatrix} U1 \\ U2 \\ U3 \\ U4 \\ U5 \\ U6 \end{bmatrix}.$$

The control method controls the manipulated variables so that the controlled variables will be adjusted to reach their target values:

$$YR = \begin{bmatrix} YR1 \\ YR2 \end{bmatrix}.$$

The controlled variables Y1, Y2 are picked up at pick-off points 35 and delivered to subtracting points 36 in which the controlled variables are subtracted from the target values YR1, YR2 to produce differences therebetween as follows:

$$\begin{bmatrix} YR1 - Y1 \\ YR2 - Y2 \end{bmatrix} = \begin{bmatrix} \epsilon 1 \\ \epsilon 2 \end{bmatrix}.$$

These differences $\epsilon 1$, $\epsilon 2$ are applied to an arithmetic element C which utilizes the matrix:

$$\begin{bmatrix} C11 & C12 \\ \vdots & \vdots \\ C61 & C62 \end{bmatrix}$$

to produce variable factors U'c1 ... U'c5 by the following linear processing:

$$\begin{bmatrix} C11 & C12 \\ \vdots & \vdots \\ C61 & C62 \end{bmatrix} \begin{bmatrix} \epsilon 1 \\ \epsilon 2 \end{bmatrix} = \begin{bmatrix} U'c1 \\ \vdots \\ U'c6 \end{bmatrix}.$$

These variable factors are applied to integrators I1 through I6 in which intergrating action is effected on the variable factors to produce manipulation variables Uc1-Uc6 which are then added to the manipulated variables U1 through U6.

These variables Uc can be expressed as a result of the integrating function performed, as follows:

$$Uc(t) = Uc(t-1) + \begin{bmatrix} C11 & C12 \\ \vdots & \vdots \\ C61 & C62 \end{bmatrix} \begin{bmatrix} \epsilon 1 \\ \epsilon 2 \end{bmatrix}(t).$$

The above intergrating action includes not only linear integrating functions by the integrators, but integrating functions or similar actions. The integrating action may include dynamic compensation.

The elements in the arithmetic element C:

$$\begin{bmatrix} C11 & C12 \\ \vdots & \vdots \\ C61 & C62 \end{bmatrix}$$

are determined in an optimum manner by an optimum control theory with the controlled extrusion line as a model and by simulation of the behavior of the variable factors U'c1 through U'c6, the manipulated variables U1 through U6, and the controlled variables Y1, Y2 at the time when the target values YR1, YR2 are given, prior to automatic control of the extrusion line 12. (Refer to "Control System Design for Furnace by Using CAD" by K, Furuta et al. at the IFAC Symposium on the Theory and Application of Digital Control, Delhi, Session 20, 1982)

The pick-off points 35 are connected to subtracting points 37 through a feedback element F. The feedback element F effects feedback action through linear processing on the measured variables Y1 through Y7 including the controlled variables Y1, Y2, and the resulting outputs are subtractively added to the manipulated quantities U1 through U6. This feedback action may include dynamic compensation. Outputs UF from the feedback element F are as follows:

$$UF = \begin{bmatrix} UF1 \\ \vdots \\ UF6 \end{bmatrix} = \begin{bmatrix} F11 & \ldots & F17 \\ \vdots & & \vdots \\ F61 & \ldots & F67 \end{bmatrix} \begin{bmatrix} Y1 \\ \vdots \\ Y7 \end{bmatrix}.$$

The elements:

$$\begin{bmatrix} F11 & \ldots & F17 \\ \vdots & & \vdots \\ F61 & \ldots & F67 \end{bmatrix}$$

can be predetermined by the foregoing optimum control theory and simulation.

Pick-off points 38 are connected through a feedforward element N to summing points 37. The feedforward element N effects feedforward action or proportionality action on the target values YR1, YR2 and the line speed YLs by way of linear processing, and resulting outputs are additionally applied to the manipulated variables U1 through U6. This feedforward action may include dynamic compensation.

Outputs UN from the feedforward element N are as follows:

$$UN = \begin{bmatrix} UN1 \\ \vdots \\ UN6 \end{bmatrix} = \begin{bmatrix} N11 & \ldots & N13 \\ \vdots & & \vdots \\ N61 & \ldots & N63 \end{bmatrix} \begin{bmatrix} YR1 \\ \vdots \\ YR2 \end{bmatrix}.$$

The elements:

$$\begin{bmatrix} N11 & \ldots & N13 \\ \vdots & & \vdots \\ N61 & \ldots & N63 \end{bmatrix}$$

can be determined as above by the optimum control theory and simulation.

Thus, three kinds of manipulation inputs are added to the manipulated variables U, which eventually be as follows:

$$U = Uc - UF + UN$$

Manipulation lines include limiters L1 through L6 for stopping the foregoing integrating actions when the summed output:

$$Uc - UF + UN$$

exceeds a predetermined range.

A portion enclosed by the doted line in FIG. 5 represents a CPU central processing unit which may be TOSBAC 7/40 type manufactured by Tokyo Shibaura Denki, K.K., Japan, and includes an input/output device I/O-1 as an input interface for the target values YR1, YR2, an input/output device I/O-2 as an output interface for D/A conversion of the manipulated electrical signals U1 through U6, and an input/output device I/O-3 as an input interface for A/D converison of the measured electrical signals Y1 through Y7 including the controlled electrical signals Y1, Y2 as they are fed back.

Operation of the automatic multivariable control method thus constructed is as follows:

The extrusion line 10 is first operated to determine initial settings for integrating actions dependent on the measured variables Y1 through Y7 including the controlled variables Y1, Y2. Then, the CPU reads data on the target values YR1, YR2, and the measured variables Y1 through Y7 including the controlled variables Y1, Y2. The arithmetic element C, the feedback element F and the feedforward element N in the CPU effect arithmetic operations according to the foregoing matrices to calculate the following values:

$$U'c = \begin{bmatrix} U'c1 \\ \cdot \\ \cdot \\ U'c6 \end{bmatrix} = \begin{bmatrix} C11 & C12 \\ \cdot & \cdot \\ \cdot & \cdot \\ C61 & C62 \end{bmatrix} \begin{bmatrix} \epsilon 1 \\ \epsilon 2 \end{bmatrix}$$

$$UF = \begin{bmatrix} UF1 \\ \cdot \\ \cdot \\ UF6 \end{bmatrix} = \begin{bmatrix} F11 \ldots F17 \\ \cdot \\ \cdot \\ F61 \ldots F67 \end{bmatrix} \begin{bmatrix} Y1 \\ \cdot \\ \cdot \\ Y7 \end{bmatrix}$$

$$UN = \begin{bmatrix} UN1 \\ \cdot \\ \cdot \\ UN6 \end{bmatrix} = \begin{bmatrix} N11 \ldots N13 \\ \cdot \\ \cdot \\ N61 \ldots N63 \end{bmatrix} \begin{bmatrix} YR1 \\ \cdot \\ YR2 \end{bmatrix}$$

The manipulated variable outputs need to be controlled so as to be maintained with a predetermined range. To this end, it is determined whether each manipulated variable outputs falls within such a predetermined range. If within the range, the integrating action is performed on the manipulated variable outputs, and if without the range, the manipulated variable outputs are caused to pass as outputs through the limiters L1 through L6 (See FIG. 6). Therefore, the integrators I1 through I6 are operated to effect integrating action on the variable factors U'c1 through U'c6 and produce the following integrated outputs:

$$Uc(t) = Uc(t - 1) + \begin{bmatrix} U'c1 \\ \cdot \\ \cdot \\ U'c6 \end{bmatrix} (t).$$

The above functions thus incorporated can overcome the problem of producing manipulated variable signals which are practically unsuitable for the manipulated variables due to initial large differences $\epsilon 1 \ldots \epsilon 4$ between the manipulated variables and the target values, notwithstanding the operation range for the inputs as the manipulated variables.

The integrators repeat their integrating action until the difference between the target values and the controlled variables:

$$\epsilon = \begin{bmatrix} YR1 \\ YR2 \end{bmatrix} - \begin{bmatrix} Y1 \\ Y2 \end{bmatrix}$$

becomes zero, so that a control loop is formed to bring the controlled variables toward the target values as closely as possible.

The manipulated variables U:

$$U = Uc - UF + UN$$

are calculated and applied to the controlled system or extrusion line 10.

The feedback outputs UF from the feedback element F function to stabilize the characteristics inherent in the control method.

The feedback outputs UN from the feedforward element N are effective to enable the controlled variables Y to approach the target values YR rapidly, especially at the start-up time of the extrusion line 10. The feedforward element N thus serves to improve the response of the control method.

After the manipulated electrical signals represented by manipulation variables U have been delivered as output electrical signals to the extrusion line 10, operation of the control method is delayed for a predetermined time interval until next sampling is carried out. Then, the foregoing cycle of operation is repeated.

The variable factors U'c which are produced from the difference $\epsilon 1$, $\epsilon 2$ between the controlled variables and the target values dependent on the line speed YLs:

$$U'c = \begin{bmatrix} U'c1 \\ \cdot \\ \cdot \\ U'c6 \end{bmatrix} (YLs)$$

are integrated to produce outputs:

$$Uc = \begin{bmatrix} Uc1 \\ \cdot \\ \cdot \\ Uc6 \end{bmatrix} (YLs)$$

which can be used as manipulated variables.

The line speed can be measured by a tachgenerator which measures the RPM of the withdrawal capstan 32.

The outputs which are obtained by effecting feedback action on the measured variables dependent on the line speed:

$$UF = \begin{bmatrix} UF1 \\ . \\ . \\ . \\ UFn \end{bmatrix} (YLs)$$

may be added to the manipulated variables. Likewise, the target values and the line speed:

$$\begin{bmatrix} YR1 \\ . \\ . \\ YRl \\ YLs \end{bmatrix}$$

may be subjected to feedforward action dependent on the line speed to produce outputs:

$$\begin{bmatrix} UN1 \\ . \\ . \\ . \\ UNn \end{bmatrix} (YLs)$$

which may be added to the manipulated variables.

The elements in the matrices C, F, N dependent on the line speed are junctions variable with the line speed, and can be predetermined by the foregoing optimum control theory and simulation.

The line speed can be incorporated in the control method such that when the line speed for the extruder changes, the extrusion line can be controlled by optimum control coefficients at that time. Stated otherwise, control is carried out by changing multivariable control coefficients as the line speed increases or decreases. Where the line speed is not utilized, the characteristics of the extrusion line exceed the limiters L1 through L6 when the extrusion line is started (when the line speed is increased from zero to a preset speed), and are kept constant. When the line speed reaches a constant speed, the control remains the same irrespective of whether the line speed is utilized or not.

In the illustrated embodiment, the rate of elongation of the cable which is an important factor in the mechanical and electrical characteristics of communication cables may be used as one of controlled variables. The rate of elongation of the cable coated with the foamed insulation may be continuously measured, and based on the result of this measurement, the voltage applied to the annealer unit 14 may be controlled as a manipulation variable. Furthermore, the line speed may be added as one of the manipulated variables.

An example of the control method of the present invention will be described:

EXAMPLE 1

A chemically foaming polyethylene compound was prepared in the form of pellets, the compound being composed of 100 parts by weight of high-density polyethylene (sold under the trade name "Hi-zex 5300E" by Mitsui Petrochemical Industries, Japan, with d=0.95 and M.I.=0.4) and 0.5 part by weight of azodicarbonamide as the chemical foaming agent. An extruder having a cylinder diameter of 65 mm as shown in FIGS. 1 through 4 was used, and the cylinder was heated up to temperatures C1=155° C., C2=175° C., C3=190° C., C4=200° C. and the crosshead was heated up to a temperature C6=200° C. The compound was supplied through the hopper 18 into the extruder, and the screw 20 was rotated about its own axis at 33 RPM. A cable conductor having a diameter of 0.4 mm was preheated by applying a constant voltage thereto, and was continuously fed into the crosshead of the extruder. At this time, the resin temperature C5 in the crosshead was 205° C., and the resin pressure P in the crosshead was 500 kg/cm$^2$. The line speed was kept constantly at 2,000 m/m. A target outside diameter of the cable coated with foamed insulation was set up as 0.580 mm, and a target electrostatic capacity of the foamed insulation was established as 300 PF/m. The diameter D and electrostatic capacity C of the cable, the cylinder temperatures C3, C4 of the extruder, the crosshead temperature C6, the resin temperature C5 and the resin pressure P in the crosshead were measured, and the voltage applied to the preheater, the RPM of the screw in the extruder, the voltages applied to the cylinder heater units, the voltages applied to the crosshead heater units, and the distance between the movable water trough and the crosshead were manipulated to effect multivariable control in order to reach the target values. As shown in FIG. 7, the outside diameter was controlled so as to fall in the range of ±1 micron of the target diameter (0.580 mm), and the electrostatic capacity C was controlled to fall in the range of ±1 PF/m of the target value (300 PF/m). Accordingly, a high-quality cable with foamed polyethylene insulation was fabricated. When the outside diameter and the electrostatic capacity were selected to deviate ±5 microns and ±5 PF/m, respectively, from the target values, the controlled quantities were adjusted independently into the target values with high-speed responsiveness.

With the embodiment of FIG. 5, in the extrusion line to be controlled in which measured variables including controlled variables such as the outside diameter D and the electrostatic capacities C vary with a plurality of manipulated variables, manipulation variables obtained by the differences between controlled variables and target values are integrated and results are added to the manipulated variables when controlling the manipulated variables to adjust the controlled variables into conformity with the target values. The manipulated variables are thus capable of functioning mutually and independently. Multivariable control can be performed while allowing the controlled variables to approach the target values even when the control system is subjected to disturbances, with the result that high-quality of foamed insulation cables having desired outside diameter and electrostatic capacity can be manufactured.

The control method has an increased response and stability with the feedforward action and/or the feedback action performed.

By incorporating the line speed into the control method, cables with their diameters and electrostatic capacities falling in a desired standard range can be fabricated even while the line speed is being increased. Accordingly, nonstandard cables or useless cables will not be produced, and the extrusion line can have an increased yield.

Figure 8:
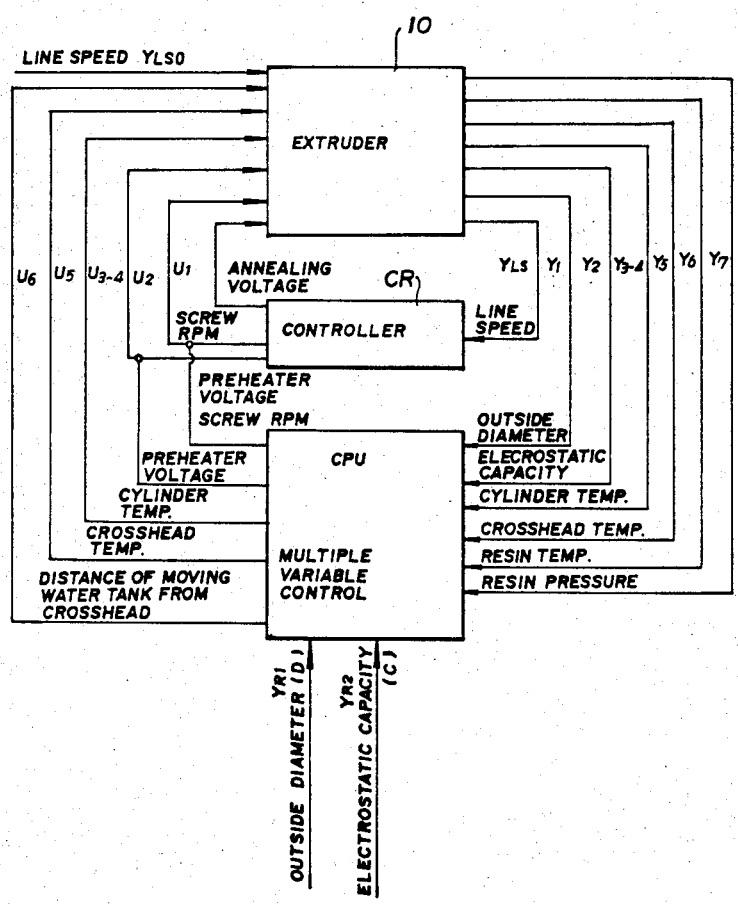
FIG. 8 is a block diagram of an automatic control method according to another embodiment for controlling the extrusion line.

FIG. 8 illustrates a control system in which a plurality of variables to be measured or measured variables:

$$\begin{bmatrix} Y1 \\ Y2 \\ Y3 \\ Y4 \\ Y5 \\ Y6 \\ Y7 \end{bmatrix}$$

which comrpises:

variables to be controlled or controlled quantities (the outside diameter D and the electrostatic capacity C):

$$Y = \begin{bmatrix} Y1 \\ Y2 \end{bmatrix}$$

of a cable extruded by the extrusion line 10 to be controlled, and condition variables affecting the controlled variables (cylinder temperatures C3, C4, a crosshead temperature C6, a resin temperature C5, and a resin pressure P) are varied by a plurality of variables to be manipulated or manipulated variables entered as input parameters (the RPM of the screw 20, the voltage applied to the preheater 16, the voltages applied to the cylinder heater units 23-3, 23-4, the voltages applied to the crosshead heater units 24-1 and 24-2, and the distance between the cooler unit 27 and the movable water trough 28) for changing the controlled variables:

$$U = \begin{bmatrix} U1 \\ U2 \\ U3 \\ U4 \\ U5 \\ U6 \end{bmatrix}$$

The control system controls the manipulated variables so that the controlled variables will be adjusted to reach their target values:

$$YR = \begin{bmatrix} YR1 \\ YR2 \end{bmatrix}.$$

Designated at YLso is an input for a line speed to be set up.

When the line speed YLs as a measured variable is applied to a controller CR, the latter produces as outputs a screw RPM U1 and a preheater voltage U2 as manipulated variables dependent on the line speed. Then, as described above with reference to FIG. 5, the measured variables Y1 through Y7 are subjected to multivariable control in the CPU, which then generates manipulated variables U1 through U6 as outputs. The outputs U1, U2 from the controller CR and the CPU are connected in common.

Another exmaple will be described below.

EXAMPLE 2

Under the same conditions (except the line speed) as in Example 1, the controller CR in the control system as shown in FIG. 8 produced manipulated variables U1, U2 dependent on the line speed YLs, and the CPU effected multivariable control on the manipulated variables U1 through U6 based on the measured variables Y1 through Y7. FIG. 9 shows results of such multivariable control performed. One of the manipulated variables produced by the controller CR, that is, the screw RPM, is also illustrated in FIG. 9. The line speed was increased, and the controller CR and the CPU started their controlling operation at a point a, and the line speed was again increased at a point b. During an interval in which the line speed increases from the point b up to a normal line speed, the outside diameter D and the electrostatic capacity C could be adjusted into their target values.

With the control method illustrated in FIG. 8, the controller CR produces manipulated variables U1, U2 dependent on a measured variable, that is, the line speed YLs. This allows differences with desired manipulated variables dependent on the line speed to be added to multivariable control outputs such as the manipulated variables U1 through U6 issued from the CPU based on the measured variables Y1 through Y7. Since the manipulated variables by the controller CR and the CPU are complementary to each other, the electrostatic capacity C and the outside diameter D can be controlled so as to be constant at all times. Accordingly, cables having constant electrostatic capacity and outside diameter can be fabricated from the time when the line speed has just started to increase. Useless cables which would otherwise be produced are greatly reduced when the line speed begins to rise, and high-quality foamed insulation cables with their electrostatic capacity and outside diameter falling in the standard ranges can be manufactured.

The line speed may also be added as one of the manipulated variables in the embodiment illustrated in FIG. 8.

With the arrangement of FIG. 8, in the extrusion line to be controlled in which measured variables including controlled variables such as the outside diameter D and the electrostatic capacities C vary with a plurality of manipulated variables, the given manipulated variables are controlled in proportion to a line speed, and manipulation variables obtained by the differences between controlled variables and target values are integrated and results are added to the manipulated variables when controlling the manipulated variables to adjust the controlled variables into conformity with the target values. The manipulated variables are thus capable of functioning mutually and independently. Multivariable control can be performed while allowing the controlled variables to approach the target values even when the control system is subjected to disturbances, with the result that high-quality of foamed insulation cables having desired outside diameter and electrostatic capacity can be manufactured.

In the foregoing embodiments, two controlled variables, two target values, six manipulation variables, six manipulated variables, and seven measured variables have been described. The present invention is also applicable to instances in which the number of controlled quantities or target values, the number of manipulation variables or manipulated variables, and the number of measured variables may be l, n, and m, respectively (l, n, and m are positive integers of 2 or greater with the relationship: n, m ≧ l).

Thus, there is provided in accordance with the invention a method for controlling an extrusion line for foamed insulation cables which has the advantages discussed above. The embodiments described are intended to be merely exemplary and those skilled in the art will be able to make variations and modifications in them without departing from the spirit and scope of the inventions. All such modifications and variations are contemplated as falling within the scope of the claims.

What is claimed is:

1. A method for controlling an extrusion line for foamed insulation cables in which a foaming insulation compound of a polyolefin resin and a foaming agent is supplied to an extruder, and extruded and coated as a foamed insulation onto a continuously fed cable conductor at a temperature higher than a decomposition temperature of the foaming agent to produce a cable that is subsequently passed through a cooler unit for controlling the outside diameter and electrostatic capacity of the foamed insulation, wherein a plurality of generated and measured electrical signals designated by measured variables:

$$\begin{pmatrix} Y1 \\ Y2 \\ \cdot \\ Yl \\ \cdot \\ \cdot \\ Ym \end{pmatrix},$$

said measured electrical signals including a plurality of controlled electrical signals designated by controlled variables:

$$Y = \begin{pmatrix} Y1 \\ Y2 \\ \cdot \\ \cdot \\ Yl \end{pmatrix},$$

said controlled electrical signals including signals representing the outside diameter and the electrostatic capacity and condition electrical signals designated by condition variables affecting said controlled electrical signals, said condition electrical signals including signals representing a cylinder temperature of the extruder, a crosshead temperature of the extruder, a resin temperature and a resin pressure in the crosshead, said controlled electric signals being variable in predetermined correlation with a plurality of manipulated electrical signals designated by manipulated variables and utilized as input parameters, said manipulated electrical signals including a line speed of the extrusion line, a voltage applied to a preheater disposed in front of the extruder, and RPM of a screw in the extruder, a voltage applied to a cylinder heater in the extruder, a voltage applied to a crosshead heater, and distance between the cooler unit and the crosshead, said manipulated variables being:

$$U = \begin{pmatrix} U1 \\ \cdot \\ \cdot \\ \cdot \\ Unl \end{pmatrix}$$

(where l, n and m are positive integers of 2 or greater with n, m≧l), said method comprising the steps of:
controlling said controlled electrical signals so as to adjust said controlled variables into target values therefore:

$$YR = \begin{pmatrix} YR1 \\ \cdot \\ \cdot \\ \cdot \\ YRl \end{pmatrix}$$

by effecting an integrating action on each of variable factors:

$$U'c = \begin{pmatrix} U'c1 \\ \cdot \\ \cdot \\ \cdot \\ U'cn \end{pmatrix}$$

which are derived from:

$$\begin{pmatrix} C11 & \ldots & C1l \\ \cdot & & \cdot \\ \cdot & & \cdot \\ Cn1 & \ldots & Cnl \end{pmatrix} \begin{pmatrix} Y1-YR1 \\ \cdot & \cdot \\ \cdot & \cdot \\ Yl-YRl \end{pmatrix}$$

where said matrix:

$$\begin{pmatrix} C11 & \ldots & C1l \\ \cdot & & \cdot \\ \cdot & & \cdot \\ Cn1 & \ldots & Cnl \end{pmatrix}$$

is predetermined so that said controlled extrusion line behaves in an optimum manner, to produce output electrical signals designated by:

$$Uc = \begin{pmatrix} Uc1 \\ \cdot \\ \cdot \\ Ucn \end{pmatrix}$$

which serve as the manipulated electric signals respectively:
effecting feedback action on said plurality of measured electrical signals to obtain output electrical signals designated by:

$$UF = \begin{pmatrix} UF1 \\ \cdot \\ \cdot \\ UFn \end{pmatrix}$$

said feedback action including applying said measured electrical signals to said manipulated signals adding said outputs UF to said manipulation variables;
suspending said integrating action while at least a sum of said outputs Uc—said outputs UF which are added to said manipulation variables exceeds a predetermined range.

2. The method according to claim 1, wherein outputs:

$$UN = \begin{bmatrix} UN1 \\ . \\ . \\ UNn \end{bmatrix}$$

which are derived by effecting a feedforward action on said target values are added to said manipulated variables.

3. The method according to claim 1, wherein an initial setting for said integrating action is established dependent on said measured variables.

4. The method according to claim 1, wherein said manipulation variables and said integrating action are derived by way of linear processing.

5. The method according to claim 1, wherein said manipulation variables include dynamic compensation.

6. The method according to claim 1, wherein said feedback action is effected by way of linear processing.

7. The method according to claim 1, wherein said feedback action includes dynamic compensation.

8. The method according to claim 2, wherein said feedforward action is effected by way of linear processing.

9. The method according to claim 2, wherein said feedforward action includes dynamic compensation.

10. The method according to claim 1, wherein said manipulation variables:

$$Uc = \begin{pmatrix} Uc1 \\ . \\ . \\ Ucn \end{pmatrix}$$

are produced by effecting an integrating action on variable factor:

$$U'c = \begin{bmatrix} U'c1 \\ . \\ . \\ U'cn \end{bmatrix} (YLs)$$

which are derived from the differences between said controlled variables and said target values dependent on said line speed.

11. The method according to claim 1, wherein outputs:

$$UF = \begin{bmatrix} UF1 \\ . \\ . \\ UFn \end{bmatrix} (YLs)$$

produced by effecting a feedback action on said measured variables dependent on said line speed are added to said manipulated variables.

12. The method according to claim 3, wherein outputs:

$$\begin{bmatrix} UN1 \\ . \\ . \\ UNn \end{bmatrix} (YLs)$$

which are produced by effecting a feedforward action on said target values and line speed:

$$\begin{bmatrix} YR1 \\ . \\ . \\ YRl \\ YLs \end{bmatrix}$$

dependent on said line speed are added to said manipulated variables.

13. A method for controlling an extrusion line for foamed insulation cables in which a foaming insulation compound of a polyolefin resin and a foaming agent is supplied to an extruder, and extruded and coated as a foamed insulation onto a continuously fed cable conductor at a temperature higher than a decomposition temperature of the foaming agent to produce a cable that is subsequently passed through a cooler unit for controlling the outside diameter and electrostatic capacity of the foamed insulation, wherein a plurality of generated and measured electrical signals designated by measured variables:

$$\begin{pmatrix} Y1 \\ Y2 \\ . \\ Yl \\ . \\ Ym \end{pmatrix},$$

said measured electrical signals including a plurality of controlled electrical signals designated by controlled variables:

$$Y = \begin{pmatrix} Y1 \\ Y2 \\ . \\ Yl \end{pmatrix},$$

said controlled electrical signals including signals representing the outside diameter and the electrostatic capacity and condition electrical signals designated by condition variables affecting said controlled electrical signals, said condition electrical signals including signals representing a cylinder temperature of the extruder, a crosshead temperature of the extruder, a resin temperature and a resin pressure in the crosshead, said controlled elctric signals being variable in predetermined correlation with a plurality of manipulated electrical signals designated by manipulated variables and utilized as input parameters, said manipulated electrical signals including a line speed of the extrusion line, a voltage applied to a preheater disposed in front of the extruder, and RPM of a screw in the extruder, a voltage applied to a cylinder heater in the extruder, a voltage applied to a crosshead heater, and distance between the cooler unit and the crosshead, said manipulated variables being:

$$U = \begin{pmatrix} U_1 \\ \cdot \\ \cdot \\ \cdot \\ U_n \end{pmatrix}$$

(where l, n and m are positive integers of 2 or greater with n, m ≧ l), said method comprising the steps of:

controlling the manipulated electrical signals such as the screw RPM and the voltage applied to the preheater dependent on the line speed; and controlling said controlled electrical signals so as to adjust said controlled variables into target values therefore:

$$YR = \begin{matrix} YR_1 \\ \cdot \\ \cdot \\ YR_l \end{matrix}$$

by effecting an integrating action on each of variable factors:

$$U'c = \begin{pmatrix} U'c_1 \\ \cdot \\ \cdot \\ U'c_n \end{pmatrix}$$

which are derived from:

$$\begin{pmatrix} C_{11} \ldots C_{1l} \\ \cdot \quad \cdot \\ \cdot \quad \cdot \\ C_{n1} \ldots C_{nl} \end{pmatrix} \begin{pmatrix} Y_1-YR_1 \\ \cdot \quad \cdot \\ \cdot \quad \cdot \\ Y_l-YR_l \end{pmatrix}$$

where said matrix:

$$\begin{pmatrix} C_{11} \ldots C_{1l} \\ \cdot \quad \cdot \\ \cdot \quad \cdot \\ C_{n1} \ldots C_{nl} \end{pmatrix}$$

is predetermined so that said controlled extrusion line behaves in an optimum manner, to produce outputs:

$$Uc = \begin{pmatrix} Uc_1 \\ \cdot \\ \cdot \\ Uc_n \end{pmatrix}$$

which serve as the manipulated variables, respectively: effecting feedback action on said plurality of measured variables to obtain outputs:

$$UF = \begin{pmatrix} UF_1 \\ \cdot \\ \cdot \\ UF_n \end{pmatrix}$$

said feedback action including applying said measured electrical signals to said manipulated signals adding said outputs UF to said manipulation variables;

suspending said integrating action while at least a sum of said outputs Uc—said outputs UF which are supplied to said manipulation variables exceeds a predetermined range.

14. The method according to claim 15, wherein outputs:

$$UN = \begin{bmatrix} UN_1 \\ \cdot \\ \cdot \\ UN_n \end{bmatrix}$$

which are derived by effecting a feedforward action on said target values are added to said manipulated variables.

15. The method according to claim 13, wherein an initial setting for said integrating action is established dependent on said measured variables.

16. The method according to claim 13, wherein said manipulation variables and said integrating action are derived by way of linear processing.

17. The method according to claim 13, wherein said manipulation variables include dynamic compensation.

18. The method according to claim 13, wherein said feedback action is effected by way of linear processing.

19. The method according to claim 13, wherein said feedback action includes dynamic compensation.

20. The method according to claim 14, wherein said feedforward action is effected by way of linear processing.

21. The method according to claim 14, wherein said feedforward action includes dynamic compensation.

* * * * *